Figure 1:
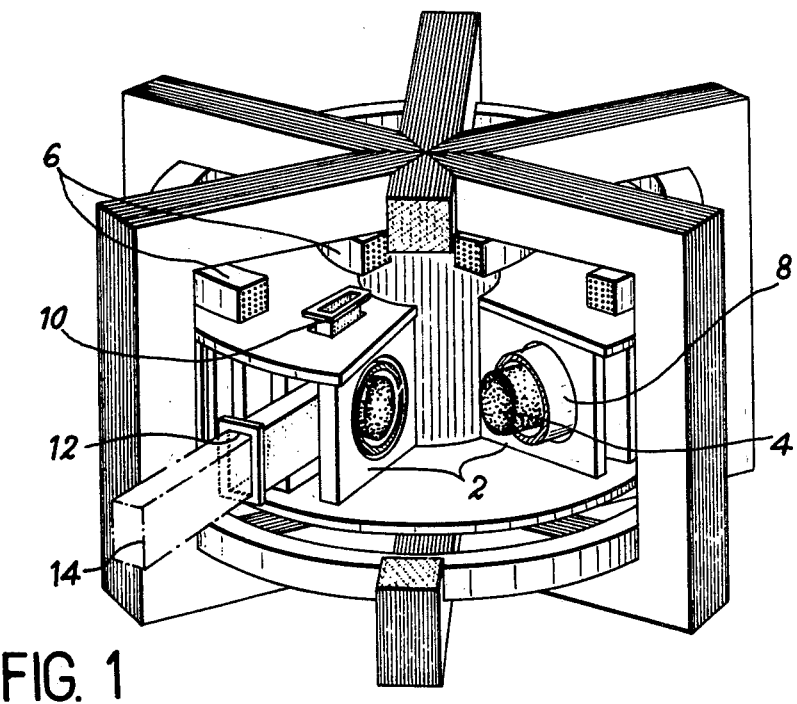

United States Patent [19]

Brambilla et al.

[11] 4,110,595
[45] Aug. 29, 1978

[54] HIGH-FREQUENCY PLASMA-HEATING APPARATUS

[75] Inventors: Marco Brambilla, St. Egreve; Pascal Lallia, Grenoble, both of France

[73] Assignee: The United States of America as represented by the United States Department of Energy, Washington, D.C.

[21] Appl. No.: 588,583

[22] Filed: Jun. 19, 1975

[51] Int. Cl.$^2$ .............................................. G21B 1/00
[52] U.S. Cl. .................................... 219/121 P; 176/3
[58] Field of Search ............... 219/121 P; 176/1, 3; 313/231.3; 315/39, 39.51, 111, 111.2, 111.7; 333/31 A, 98 R, 99 PL; 343/777, 778

[56] References Cited

U.S. PATENT DOCUMENTS

| | | | |
|---|---|---|---|
| 3,027,557 | 3/1962 | Gent | 343/778 |
| 3,218,580 | 11/1965 | Zanichkowsky | 343/778 X |
| 3,500,422 | 3/1970 | Cheston et al. | 343/778 |
| 3,755,760 | 8/1973 | Ohm | 333/31 A |
| 3,778,343 | 12/1973 | Coppi et al. | 176/3 |
| 3,801,939 | 4/1974 | Lamy et al. | 333/98 R X |

*Primary Examiner*—J. V. Truhe
*Assistant Examiner*—Clifford C. Shaw
*Attorney, Agent, or Firm*—Dean E. Carlson; R. G. Erdley; William R. Woodward

[57] ABSTRACT

An array of adjacent wave guides feed high-frequency energy into a vacuum chamber in which a toroidal plasma is confined by a magnetic field, the wave guide array being located between two toroidal current windings. Waves are excited in the wave guide at a frequency substantially equal to the lower frequency hybrid wave of the plasma and a substantially equal phase shift is provided from one guide to the next between the waves therein. For plasmas of low peripheral density gradient, the guides are excited in the $TE_{01}$ mode and the output electric field is parallel to the direction of the toroidal magnetic field. For exciting waves in plasmas of high peripheral density gradient, the guides are excited in the $TM_{01}$ mode and the magnetic field at the wave guide outlets is parallel to the direction of the toroidal magnetic field. The wave excited at the outlet of the wave guide array is a progressive wave propagating in the direction opposite to that of the toroidal current and is, therefore, not absorbed by so-called "runaway" electrons.

7 Claims, 4 Drawing Figures

HIGH-FREQUENCY PLASMA-HEATING APPARATUS

The present invention relates to high-frequency plasma heating apparatus. Such apparatus is primarily for heating a plasma of the toroidal type confined in particular by a toroidal magnetic field $B\phi$, the heating being done by an electromagnetic wave at the lower hybrid resonance of the plasma.

It is known that at the present time plasma research, i.e. research on high-temperature ionized gases, has the principal objective of producing hot and stable plasmas, in which a sufficient number of thermonuclear reactions take place to enable the energy balance to become positive and thus to demonstrate the possibility of extracting energy by a controlled fusion reaction.

Machines of the toroidal type, Tokamak or Stellarator, comprise a plasma closed on itself, of substantially toroidal shape in the case of the Tokamak, and enable the production of relatively hot and confined plasmas during periods that should approach as much as one second or even several tens of seconds. These plasmas are mainly heated by the toroidal current $I\phi$ circulating in the plasma or by way of adiabatic compression effects, but they must also be heated by means of direct application of energy on the ions.

For that, it is advantageous to generate waves, preferably electromagnetic in order that they may be capable of propagation in vacuum, outside of the plasma, these waves being coupled with the ionized particles existing in the plasma, electrons and ions (preferably the ions, since it is the ions that must be heated in order that their nuclei may generate nuclear fusion reactions).

To produce good coupling between the particles and the heating waves, it is necessary that the phase velocity of these waves should be of the order of magnitude of the thermal velocity of the plasma particles, so that a resonant exchange may take place between the waves and the particles moving at the same velocity as the aforesaid waves. The value of this phase velocity imposes conditions described below on the value of the frequency and of the wavelength of the heating waves.

The lower hybrid resonance wave is a high-frequency wave capable of usefully serving to heat a plasma. In the usual operating conditions of the plasma of toroidal machines, the frequency of this wave is in the range extending from 500 MHz to 3 GHz. For these frequencies, the power level may be of the order of several megawatts, the amount presently necessary for effectively heating the plasma in a time lapse of the order of one second.

There are a large number of ultra high-frequency systems suitable for generating a wave in a plasma: interdigital structures, meandering path structures, etc. All of these need to be located inside the vacuum chamber and thus reduce the useful volume thereof and, consequently, also the output of the Tokamak or of the Stellarator. These structures, in addition, present serious technical problems, in particular for resistance to neutron bombardment, when they are inserted in a thermonuclear reactor. To excite waves in the plasma and thus to heat it, the use of a number of wave guides separated each from the others and each inserted in one of the access stubs distributed around the periphery of the plasma machine has been proposed. This possibility, on account of the magnitude of the distance between two stubs, presents the serious disadvantage that the major portion of the power is localized in the portion of the excited wave spectrum that does not penetrate into the interior of the plasma. In other terms, the principal wavelength of the waves excited by the different wave guides inserted in the access stubs is always too great on account of the spacing of the latter (it cannot be less than the distance between two stubs) and, hence, corresponds to an index of refraction $N_{//}$ in the toroidal direction of the wave that is too small to satisfy the conditions for accessibility and penetration of the wave into the plasma that are set forth below.

One of the objects of the present invention is to insert in the vacuum chamber surrounding the plasma an apparatus for generating high-frequency waves at the frequency of the lower hybrid resonance of the plasma, making it possible to induce waves in the plasma at a frequency and at a wavelength assuring a good penetration of these waves into the volume of the plasma and thus a good heating effect.

Another object of the present invention is to place the aforesaid wave generator in suitable locations where it does not diminish the space accessible to the plasma.

Another object of the present invention is to send waves into the plasma of which the polarization is adapted to the density gradient of the periphery of the plasma, in order to produce an optimum penetration of the waves into the plasma.

Still another object of the present invention is to insert into the vacuum chamber a wave excitation structure that does not introduce materials in the vacuum chambers surrounding the plasma that might be damaged by neutron bombardment or that might be likely to inject impurities into the plasma under the influence of such bombardment.

Finally, one of the objects of the invention is to generate waves in the plasma that are not subject to absorption by fast electrons, the so-called "ranaway" electrons that move at high velocity at the periphery of the plasma and which are not useful for thermonuclear fusion reactions.

The subject matter of the present invention is, in particular, a high-frequency plasma heating apparatus palliating the previously mentioned inconveniences and realizing the advantages and attaining the objectives set forth above, the apparatus in question comprising a network of adjacent wave guides disposed between toroidal current coils, the said coils surrounding a vacuum chamber of torus shape in which the plasma of the same shape is formed and creating the magnetic field $B\phi$. The aforesaid wave guide network leads into the vacuum chamber. The apparatus also comprises means to excite waves of the frequency corresponding to the lower hybrid resonance of the body of the plasma. These waves are dephased by substantially the same phase shift.

The excited waves are $TE_{01}$ waves for the relatively weak density gradients external to the plasma and $TM_{01}$ waves for relatively high density gradients. To avoid the excitation of high-velocity electrons accelerated by the electric field existing in the plasma, the said electric field being parallel to the current $I\phi$ circulating in the plasma, there is generated, in a preferred form of embodiment of the invention, a progressive wave propagating in a direction opposed to that of the current $I\phi$, so as to suppress all interation with the "runaway" electrons.

As will be seen in what follows, the configuration of the wave guide according to the invention is preferably elbowed in order that the portions directly seen by the plasma should be only metallic portions (steel, aluminum) having little likelihood of introducing impurities into the plasma.

Figure 2:
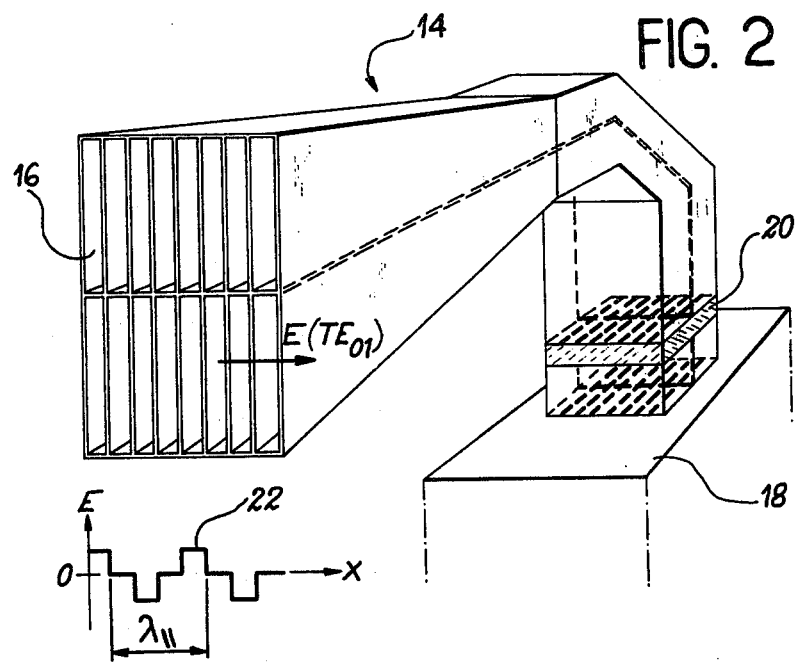
Figure 3:
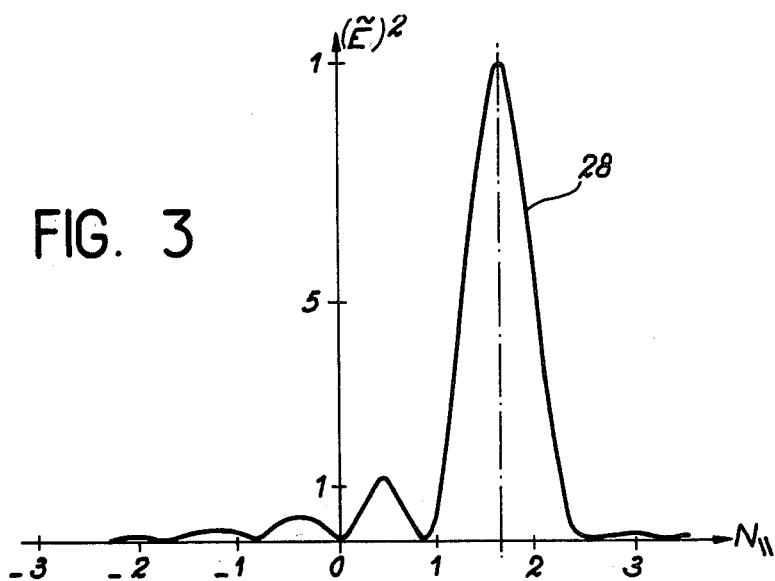
Figure 4:
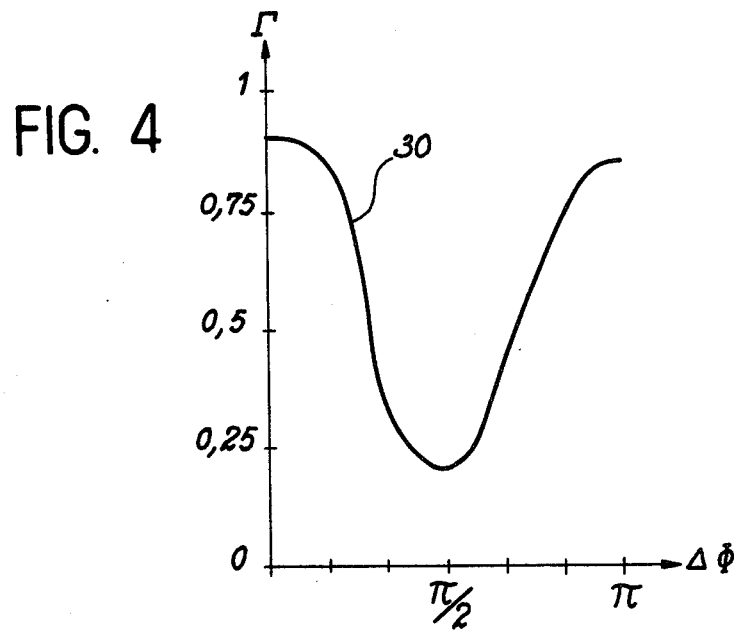

Other characteristics and advantages of the invention will appear more clearly after the following description of examples of embodiments given by way of explanation, and in no way limitative, with reference to the annexed drawings, in which there are represented:

in FIG. 1, a general view of a plasma machine of the Tokamak type and the disposition of wave guides according to the invention in this type of machine;

in FIG. 2, a wave guide structure according to the invention used in the heating apparatus according to the invention;

in FIG. 3, the Fourier spectrum corresponding to the waves excited by the structure and the excitation of the different wave guides of the heating apparatus, and in FIG. 4, a graph of the coupling coefficient of the apparatus with the plasma as a function of the phase shift of the wave between each guide and the next.

In FIG. 1, there is represented a schematic view of a Tokamak used to generate a high-temperature plasma. The toroidal coils 2 produce a toroidal field $B\phi$ inside the plasma 4 and a current $I\phi$ exists inside the same plasma 4. The polar field $B_\theta$ necessary for the stability of the plasma is produced by coils such as the coil 6 carrying heavy currents. The plasma is confined in a hermatically sealed vacuum chamber 8, in which openings such as the opening 10 are provided for observing the plasma. Openings such as the opening 12 are provided between the toroidal coils 2. The high-frequency heating apparatus 14 according to the invention is situated in the type of opening 12 just mentioned and is constituted of a plurality of adjacent guides. The apparatus 14 according to the invention penetrates as little as possible into the vacuum chamber 8, in order not to limit the space accessible to the plasma.

In FIG. 2, the high-frequency heating apparatus according to the invention is shown designated generally by the reference numeral 14. The portion penetrating into the vacuum chamber 8 is the portion in the form of a grill constituted by a plurality of adjacent wave guides, such as the guide 16. Each elementary guide is fed by one or more klystrons; the phase shift between each wave guide path is obtained by phase shifters placed between a single pilot oscillator and the power output klystron for each path. The structure of the apparatus 14 makes it possible to separate the klystron feed 18 from the output portion of these wave guides, this separation being provided by a dielectric window 20, which is not in the direct view of the plasma, an arrangement which avoids all problems of destruction of the said window and of the introduction of impurities into the plasma by the electronic, neutronic and photonic bombardment of this window 20. In FIG. 2 there is also shown, by the curve 22, the variations of the electric field as a function of the direction Ox of the toroidal field in the case of the $TE_{01}$ mode. The $TE_{01}$ mode is the best polarization of the wave, with the electric field E at the outlet of the wave guide parallel to the direction of the toroidal magnetic field $B\phi$, in the case where the density gradients of the plasma are sufficiently weak. The electric field is represented by the curve 22 for a given instant, each portion of the wave being shifted in phase by from one guide to the next.

The frequency of the waves excited in the plasma, i.e. the frequency of the lower hybrid wave, is given by the equation:

$$\epsilon_1 = 1 - \frac{\omega_{pe}^2}{\omega^2 - \omega_{ce}^2} - \frac{\omega_{pi}^2}{\omega^2 - \omega_{ci}^2} = 0$$

where $\omega$ is the frequency of the wave, $\omega_{pe}$ and $\omega_{pi}$ the electronic and ionic plasma frequencies, $\omega_{ce}$ and $\omega_{ci}$ the electronic and ionic cyclotron frequencies, $\epsilon_1$ being the first diagonal term of the dielectric tensor for a magnetic field $B\phi$ along the Oz axis. This equation may be written more explicitly as follows:

$$\omega_{LH}^2 = \omega_{ce}\omega_{ci}\frac{\omega_{pe}^2 + \omega_{ce}^2}{\omega_{pe}^2 + \omega_{ce}\omega_{ci}}$$

$\omega_{LH}$ being the frequency of the lower-frequency hybrid wave. The solution in the rather general case where the frequency $\omega_{LH}$ of the lower-frequency hybrid wave is lower than both the electronic plasma frequency and the electronic cyclotron frequency and is well above the ionic cyclotron frequency is given by:

$$\omega_{LH}^2 \approx \frac{\omega_{pi}^2}{1 + \frac{\omega_{pe}^2}{\omega_{ce}^2}}$$

If the values of the magnetic fields and of the plasma densities are known, the frequency $\omega_{LH}$ of the lower-frequency hybrid wave is well defined, and it is this frequency that is produced by the klystrons 18 of the apparatus according to the invention.

In order that the wave should penetrate into the interior of the plasma, it is necessary to slow down its phase velocity in the direction parallel to the static magnetic field $B\phi$ so as to satisfy the accessibility relation given by:

$$N_{//}^2 > 1 + \frac{\omega_{pe}^2}{\omega_{ce}^2}$$

where $N_{//}$ is the index of propagation of the wave in the direction of the static magnetic field $B\phi$ and the ratio $\omega_{pe}^2/\omega_{ce}^2$ varies between 1/10 and 1 in Tokamaks and Stellarators. The value of the excited wavelength $\lambda_{//}$ is indicated on the curve 22, this being the wavelength measured in a direction parallel to the toroidal direction. At the time of introduction into the plasma, the hybrid wave is subject to a rotation of its polarization: the electric field which was in the toroidal direction is transformed into a radial field. That is why it is necessary to specify at each point the polarization of the wave and the value of the index of the plasma as a function of the direction. For additional information regarding the indices of the plasma and the polarizations of this type of wave, it is useful to consult the text "The Theory of Plasma Waves" by T. Stix, published by McGraw-Hill Book Company, New York (1962). The index corresponding to this wave taken in a parallel direction, that is, in the toroidal direction, is related to the toroidal wavelength by the formula:

$$N_{11} = \frac{2\pi C}{\omega_{LH} \lambda_{11}}$$

where $\omega_{LH}$ is the frequency of the lower-frequency hybrid wave.

In FIG. 3, there is plotted by the curve 28 the Fourier spectrum of the wave represented by the curve 22, for every value of $\lambda_{//}$ corresponding to a value of $N_{//}$. The different values of $N_{//}$ in the spectrum are due to the fact that the shape of the curve given by 22 is not a pure sinusoid which would give a single value of the wavelength $\lambda_{//}$ and a Dirac pulse in frequency. It is seen that the second positive maximum of the spectrum allows the accessibility condition $N > 1$ to be satisfied.

The choice of the dimensions and the number of the wave guides and of the phase shift between one guide and the next makes it possible to obtain an excitation spectrum of such a nature that the major portion of the power is radiated in waves satisfying the accessibility condition $N_{//} > 1$, avoiding however the values of $N_{//} > 4$ that would be easily absorbed by the thermal electrons at the fringe of the plasma. The excitation of a progressive wave in the plasma propagating the direction opposite to that of the current I$\phi$ existing in the plasma of a Tokamak makes it possible to avoid the undesired absorption of the high-frequency power by runaway electrons that may ultimately appear, because the wave progresses in the direction opposed to the electric field that accelerates fast electrons. The creation of a progressive wave in the plasma is effected by slight differences in phase shift relative to a constant phase shift between each guide, or by a slight dissymmetry in the geometric structure. The generation of a progressive wave generated by a wave guide array is well known by those skilled in the electronic art and is, therefore, not set forth in any further detail.

In FIG. 4 there is shown by the curve 30 the variations of the reflected power coefficient $\Gamma$ of the wave produced at the grill of the apparatus according to the invention as a function of the phase shift $\Delta\phi$ between each guide. It is seen that the reflection coefficient is minimized by a $\pi/2$ phase shift between the excitation of each successive guide and that the reflection coefficient $\Gamma$ is sufficiently weak to obtain a good coupling between the wave launched by the guide and the portion absorbed by the plasma. The phase shift of 90° between each successive guide is imposed at the level of the klystrons feeding each guide of the grill. phase shifter between the klystrons is not further described, because this device is well known by those skilled in the art.

It has been shown that in certain cases and for certain configuration where the rise of density from vacuum to plasma is very rapid, i.e. for high density gradients in the plasma, it is more favorable to utilize excitation waves of the $TM_{01}$ type, that is, waves of which the magnetic field at the outputs of the wave guide is in the toroidal direction (parallel to the field B$\phi$).

In FIG. 2, there is represented a wave guide measuring 50 cm in height by 46 cm in width. At a frequency of 750 MHz and for individual guides of a cross-section 5.75 cm by 25 cm height, the power P transmitted by such a grill is expressed by the formula:

$$P = \frac{1}{40} \cdot \frac{\lambda_0}{\lambda_g} A \cdot \frac{(1-\Gamma)}{(1+\Gamma)} E^2$$

where P is in megawatts,
$\lambda_O$ is the wavelength in vacuum
$\lambda_g$ is the wavelength in each guide
A is the frontal surface of the grill in cm$^2$,
E is the electric field in the grill in kV/cm
$\Gamma$ is the reflection coefficient of the grill.
In the example chosen:
P = 0.63 E$^2$ if $\Gamma = 0$
P = 0.55 E$^2$ if $\Gamma = 20\%$
For a high-frequency electric field of 2 KV per cm in the neighborhood of the plasma, the apparatus according to the invention makes it possible to transmit a power of about 2 MW for a coefficient $\Gamma$ of the order of 20%.

Although this description has mentioned constant phase shifts from one elementary guide to the next between the waves that are respectively propagated there, it is quite possible, and useful in some cases, to provide phase shifts between the waves propagating within adjoining elementary guides selected in a different manner.

In summary, the apparatus according to the invention makes it possible to couple to the plasma the power necessary for additional heating, that is, a power of several megawatts, which is indispensable for reaching the point of thermonuclear ignition, with the following technical advantages:
  no diminution of the volume of the vacuum chamber,
  the material used (steel, aluminum) is compatible with the technology of thermonuclear reactors, and
  no modification is required of the present-day conception of toroidal machines.

Even though this description has been provided with reference to a particular case of a plasma of the toroidal type generated in a machine of the Tokamak type excited by the lower hybrid frequency, it is quite evident that the apparatus according to the invention can be applied to high-frequency heating of plasmas of any configuration (provided that it is suitably oriented with reference to the local magnetic field) and at any frequency having the characteristic that it is absorbed by the plasma.

We claim:

1. Apparatus for high-frequency heating of a plasma confined by a magnetic field (B$\phi$) and traversed by a current (I $\phi$), characterized in that it comprises at least one array of adjacent wave guides opening into a vacuum chamber containing said plasma, means for exciting in each guide of said array a high-frequency wave so that the waves respectively propagate inside each guide and relative phase-shift producing means such that at least at and near the output end of said guides there is a phase shift between the waves in successive adjacent guides of said array, the phase shifts between successive pairs of guides together producing progressive steps of phase shift across a dimension of the array which is essentially parallel to the direction of said plasma-confining magnetic field where said guides open into said vacuum chamber.

2. Apparatus for high-frequency heating of a plasma, said plasma being of the toroidal type confined by toroidal magnetic field (B$\phi$) and traversed by a current (I$\phi$), said magnetic field (B$\phi$) being generated by coils carrying toroidal current encircling a torus-shaped vacuum chamber within which is formed a torus-shaped plasma, characterized in that the apparatus comprises at least one array of adjacent wave guides, each said array being disposed between two toroidal current coils and being open to said vacuum chamber, and means for exciting in each guide of said array a high-frequency wave of which the frequency is substantially equal to the frequency of the lower frequency hybrid wave of the plasma, including means for causing the waves propagating in the interior of each guide of said array to have a progressive relative phase relation between successive guides of the array disposed in the array dimension that is a plane perpendicular to the axis of the vacuum chamber, such that there is substantially the same phase shift from each guide to the next adjacent guide in the array.

3. Apparatus according to claim 2, characterized in that each wave guide is excited in the $TE_{01}$ mode, the electric field of the wave at the outlet of the wave guide being essentially parallel to the direction of said toroidal magnetic field ($B\phi$).

4. Apparatus according to claim 2, adapted for the excitation of waves in plasmas of high peripheral density gradient, characterized in that each guide is excited in the $TM_{01}$ mode, the magnetic field of the wave at the outlet of the wave guides being essentially parallel to the direction of said toroidal field ($B\phi$).

5. Apparatus according to claim 2, characterized in that the wave excited at the outlet of the wave guide array is a progressive wave propagating in the direction opposite to that of the toroidal current ($I\phi$).

6. Apparatus according to claim 2, characterized in that said array of adjacent wave guides is elbowed and in that the dielectric window separating the means for exciting the waves from the outlets of the guides is not directly in view of the plasma.

7. Apparatus according to claim 2, characterized in that the opening of each of the guides communicating with the vacuum chamber surrounding the plasma has a rectangular crosssection of which the smaller sides are essentially parallel to the direction of the magnetic field ($B\phi$).

* * * * *

UNITED STATES PATENT AND TRADEMARK OFFICE
CERTIFICATE OF CORRECTION

PATENT NO. : 4,110,595
DATED     : August 29, 1978
INVENTOR(S) : Marco Brambilla et al It is certified that error appears in the above-identified patent and that said Letters Patent is hereby corrected as shown below:

On the title page, assignee should read

-- The United States of America as represented by the
United States Department of Energy, Washington, D.C.
and Commissariat a l'Energie Atomique, Grenoble, France,
part interest. --.

Signed and Sealed this

Seventh Day of May 1985

[SEAL]

*Attest:*

DONALD J. QUIGG

*Attesting Officer*     *Acting Commissioner of Patents and Trademarks*